United States Patent [19]

Morgan

[11] 4,259,188
[45] Mar. 31, 1981

[54] FLUID FILTER HOUSING AND FILTER BAG SEAL

[75] Inventor: Howard W. Morgan, Michigan City, Ind.

[73] Assignee: Filter Specialists, Inc., Michigan City, Ind.

[21] Appl. No.: 43,154

[22] Filed: May 29, 1979

[51] Int. Cl.³ .......................................... B01D 29/12
[52] U.S. Cl. .................................. 210/448; 210/451; 210/453; 210/455
[58] Field of Search ............... 210/435, 445, 450, 451, 210/452, 453, 455, 459, 497 R, 448; 55/378, 373, 502

[56] References Cited

U.S. PATENT DOCUMENTS

| 1,908,933 | 5/1933 | Tinello | 210/445 |
| 3,592,768 | 7/1971 | Parker | 210/445 |
| 4,133,769 | 1/1979 | Morgan | 210/455 |

*Primary Examiner*—Frank Sever
*Attorney, Agent, or Firm*—Oltsch, Knoblock & Hall

[57] ABSTRACT

An improved fluid filter housing and filter bag seal wherein the filter bag includes an annular downturned lip of flexible, shape-retaining material which in part defines an opening into the bag. The housing carries an annular rim in part defining an opening into the housing. The bag lip is forced into sealing engagement with the housing rim by the housing cap to form a fluid-tight seal.

9 Claims, 4 Drawing Figures

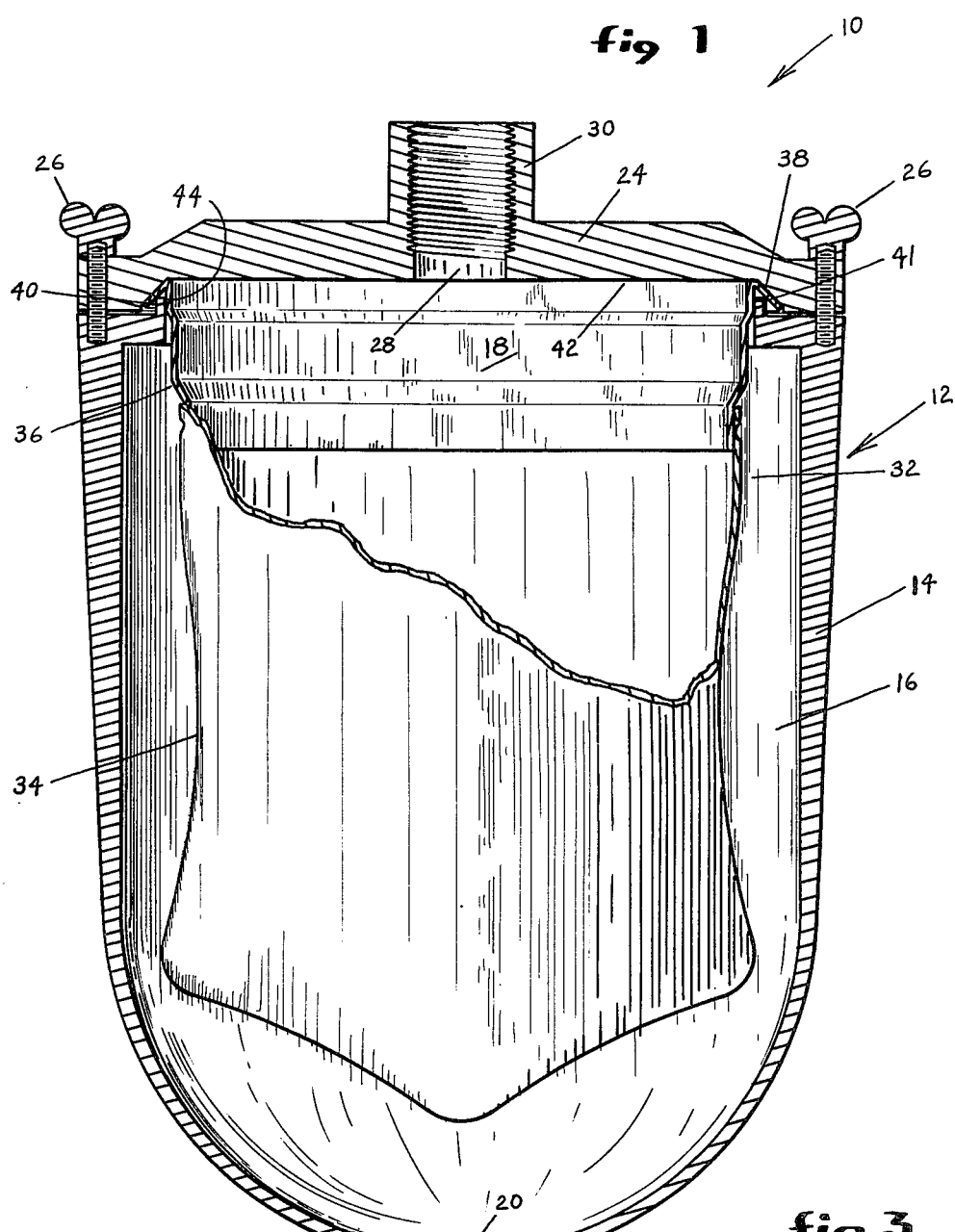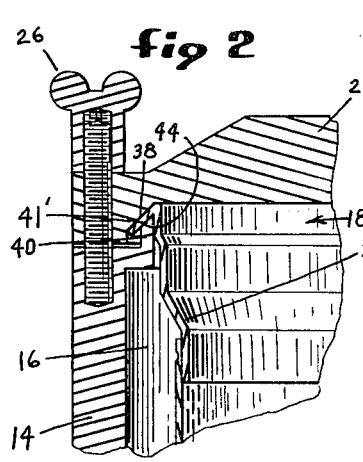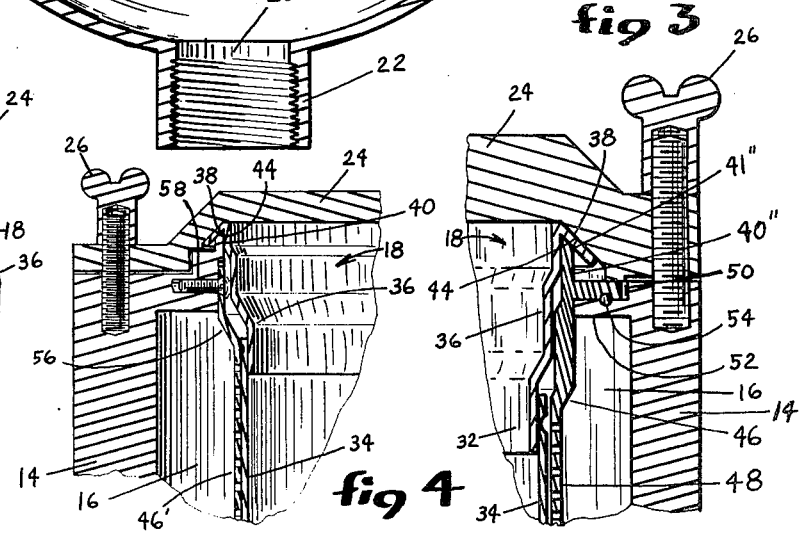

FLUID FILTER HOUSING AND FILTER BAG SEAL

SUMMARY OF THE INVENTION

This invention relates to an improved fluid filter having a removable filter bag.

In the filter of this invention the filter bag includes a side wall of fluid pervious material and a ring defining an opening into the bag formed of flexible, shape-retaining fluid impervious material. The ring is formed into an external downturned lip. The filter housing carries an annular rim defining in part an opening into said housing. When the filter bag is inserted into the housing through the housing opening, its external lip overlies the annular rim at the housing opening. A cap spans the housing opening and is secured to the housing by a plurality of hold-down members. The cap contacts the bag ring which is urged at its lip into a fluid-tight seal with the rim carried by the filter housing.

Accordingly, it is an object of this invention to provide an improved fluid filter housing and filter bag seal.

Another object is to provide a filter housing and filter bag which cooperate to form a fluid-tight seal.

Another object is to provide a filter housing having a cap which cooperates with the filter bag to form a fluid-tight seal.

Still another object is to provide a fluid filter which is efficient and economical.

Yet another object is to provide a fluid filter which is reliable and easily serviced.

Other objects will be apparent from the following specification.

BRIEF DESCRIPTION OF THE DRAWINGS

FIG. 1 is a sectioned elevational view of the filter housing and cap with part of the filter bag broken away for purpose of illustration.

FIG. 2 is a partial sectioned elevational view of another embodiment of the filter.

FIG. 3 is a partial sectioned elevational view of yet another embodiment of the filter.

FIG. 4 is a partial sectioned elevational view of still another embodiment of the filter.

DESCRIPTION OF THE PREFERRED EMBODIMENTS

The preferred embodiments illustrated are not intended to be exhaustive or to limit the invention to the precise forms disclosed. They are chosen and described to explain the principles, application, and practical use of the invention to thereby better enable others skilled in the art to utilize the invention. Such preferred embodiments are illustrated in FIGS. 1-4.

With reference to FIG. 1, filter 10 includes a housing 12 having a side wall 14 defining a chamber 16 within the housing and an opening 18 into the housing. Housing 12 has a fluid outlet port 20 which may be adapted for connection to a pipe or other conduit, as by a threaded boss 22.

A cap 24 spans the opening 18 of housing 12 and is releasably secured to the housing by a multiplicity of threaded hold-down members 26. Cap 24 has a fluid inlet port 28 which may be adapted for connection to a pipe or other conduit, for example by the threaded boss 30.

A filter bag 32 is removably inserted into chamber 16 of housing 12 through opening 18. Bag 32 has a side wall 34 formed of fluid pervious material and a ring 36 formed of flexible shape-retaining fluid impervious material. Ring 36 defines an opening into bag 32. Ring 36 includes an external downturned lip 38 which is continuous about the circumference of ring 36 and conicallly tapers away from bag 32. Lip 38 is formed of flexible shape-retaining fluid impervious material. In section, lip 38 is angled and forms an angle of less than 90° with side wall 34 of bag 32.

Side wall 14 of housing 12 includes an annular rim 40 which has an end edge 41 and which in part defines opening 18 into housing 12. Ring 36 of bag 32 is received coaxially in opening 18 of housing 12 with side wall 34 of bag 32 projecting into housing chamber 16. External lip 38 of ring 36 overlies the rim 40 of housing side wall 14. Cap 24 has an inner surface 42 of which a portion 44 is conically tapered to complementary contact bag lip 38.

When cap 24 is urged toward housing 12 by threaded hold-down members 26, bag lip 38 is compressed about its circumferential dimension between end edge 41 of rim 40 and the inner conical surface 44 of cap 24 to make a fluid-tight seal with the filter housing. The seal thus formed extends completely around the perimeters of the housing rim 40 and of cap surface 44. Thus the interior of bag 32 within housing 12 is sealed in a fluid-tight manner from housing chamber 16 at bag lip 38. Fluid admitted to the housing through inlet port 28 must pass through the fluid pervious material of bag side wall 34 to reach outlet port 20.

FIG. 2 illustrates another embodiment of the invention. In this embodiment the end edge surface 41' of housing rim 40 is conical and tapers away from housing opening 18. Bag lip 38 is positioned between the illlustrated substantially parallel rim surface 41' and cap surface 44. When the cap 24 is urged toward the housing upon tightening of hold-down members 26, bag lip 38 is compressed to seal about its perimeter as previously described.

FIG. 3 illustrates yet another embodiment of the invention. A filter basket 46 having a perforated shape-retaining side wall 48 is removably fitted into housing cavity 16 through its opening 18. Basket 46 has an annular flange 50 which in part defines an opening into the basket and which rests upon an internal flange 52 of housing side wall 14. An O-ring 54 is positioned between the flanges 50 and 52. Filter bag 32 is inserted into basket 46. Flange 50 of basket 46 includes a rim 40". End edge surface 41" of rim 40" is conical and tapers away from the basket opening. Bag lip 38 is positioned between rim surface 41" and cap surface 44 to provide a seal between the basket at rim 40" and cap 24 when the cap is secured to housing 12.

Still another embodiment of the invention is illustrated in FIG. 4. Basket 46' has a margin 56 which is attached to side wall 14 by fasteners 58. Rim 40 is carried by housing side wall 14 above basket margin 56 and provides a seal with bag lip 38 as described with reference to FIG. 2.

It is to be understood that in all the embodiments shown the interface of cap 24 and housing side wall 14 is sealed by the interposed lip 38 so that fluid does not leak into or out of the housing.

It is to be understood that the invention is not to be limited to the precise forms disclosed but that it may be modified within the scope of the appended claims.

What I claim is:

1. A fluid filter including a housing having a side wall defining a chamber therein, said housing having an opening to said chamber, a cap spanning said housing opening, securing means for releasably connecting said cap to said housing, an inlet port and an outlet port, a filter bag having a side wall formed of fluid pervious material; said bag including a ring formed of a shape-retaining, fluid impervious material defining an opening into said bag, said filter bag being received in said housing chamber with said bag opening in communication with said housing opening, the improvement therein comprising an annular rim carried by said housing and defining in part said housing opening, said bag ring including an external downturned flexible circumferential lip, said bag lip forming an acute angle with respect to said bag side wall, said bag lip overlying said rim, said cap having an inner surface, said cap inner surface contacting said bag lip and urging said lip into fluid-tight engagement with said rim entirely about the rim when said securing means connects said cap to said housing.

2. The fluid filter of claim 1 wherein said cap inner surface in conically tapered above said rim and makes complemental engagement with said bag lip.

3. The fluid filter of claim 2 wherein said rim includes an upturned part having an end edge, said end edge lying in a plane substantially paralleling said housing opening, said bag lip fitted over said upturned part at its end edge.

4. The fluid filter of claim 2 wherein said rim includes an upturned part having a conical edge surface, said edge surface tapering away from said housing opening (end) and complementarily fitting into said acute angle between said bag side wall and said bag lip.

5. The fluid filter of claim 1 and a filter basket, said filter basket being removably received in said housing chamber, said basket including an annular flange defining an opening into said basket, said bag received in said basket, said basket flange resting upon said housing side wall, said basket flange including said rim.

6. The fluid filter of claim 5, wherein said rim includes an upturned part having an end edge, said end edge lying in a plane substantially paralleling said housing opening, said bag lip fitted over said upturned part at its end edge.

7. The fluid filter of claim 5, wherein said rim includes an upturned part having a conical edge surface, said edge surface tapering away from said housing opening and complementarily fitting into said acute angle between said bag side wall and said bag lip.

8. The fluid filter of claim 1 wherein said securing means for connecting said cap to said housing includes a plurality of threaded hold-down members.

9. The fluid filter of claim 1 wherein said contact between said cap inner surface and bag lip forms a fluid-tight seal about the lip with the cap.

* * * * *